Feb. 15, 1949.  H. T. TORNBERG  2,461,857
AUTOMATIC LOCKING SPINDLE
Filed Aug. 30, 1947

HENNING T. TORNBERG,
INVENTOR.
BY: *[signature]*
ATTORNEY.

Patented Feb. 15, 1949

2,461,857

UNITED STATES PATENT OFFICE 2,461,857

AUTOMATIC LOCKING SPINDLE

Henning T. Tornberg, Ridgewood, N. J., assignor to Modern Plastic Machinery Corporation, Lodi, N. J., a corporation of Delaware Application August 30, 1947, Serial No. 771,478

1 Claim. (Cl. 242—46.2)

The present invention relates to a spindle for carrying a spool, as for instance in a thread winding machine.

An object of this invention is to provide a spindle of the character mentioned, of novel and improved construction, whereby a spool thereon is easily secured thereto, or made loose thereon.

Another object hereof is to provide a novel and improved spool-locking device which is permanently associated with the spindle on which the spool is to be mounted and requires no putting on or taking off of parts, to mount or remove the spool.

A further object of this invention is to provide a novel and improved spindle and locking device of the kind described, which is of simple construction, cheap to manufacture, easy to use and efficient in carrying out the purposes for which it is designed.

Other objects and advantages will become apparent as this disclosure proceeds.

In the accompanying drawings forming part of this specification, similar characters of reference indicate corresponding parts in all the views.

Figure 1:
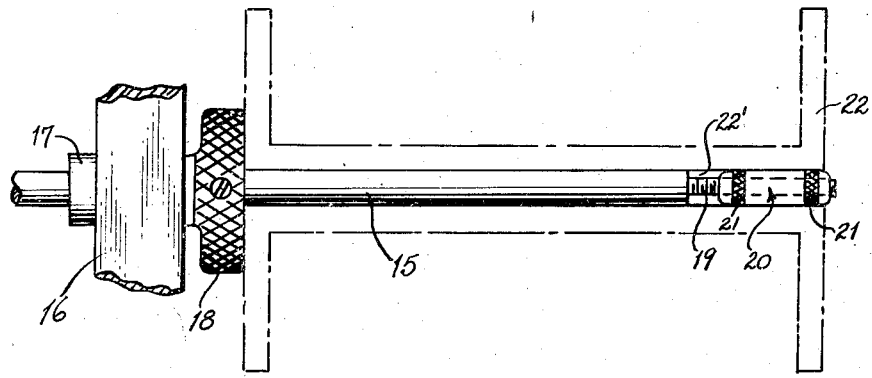
Fig. 1 shows a spindle embodying the teachings of this invention.
Figure 2:
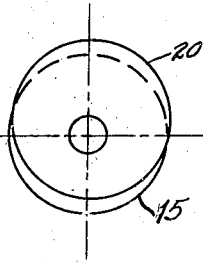
Fig. 2 is an enlarged end view of Fig. 1.

In the drawings, the numeral 15 designates a spindle member which is preferably a rod, journalled to a frame 16, by means of collar 17, and the knurled collar 18. A screw 19, of comparatively smaller diameter than said rod stock, extends forwardly coaxially of said spindle member 15, and carries thereon a preferably cylindrically shaped nut member 20, in threaded engagement therewith. The nut member 20, and the spindle member 15, are preferably of the same rod stock, but the threaded bore of the nut member is slightly off center, thereby making said nut member what may be deemed an eccentric or cam, having movement when rotated, along the longitudinal axis line of the spindle 15. An eccentricity of but a few thousandths of an inch is found to be sufficient in most cases. The nut member 20, has one or more knurled lanes 21 for gripping the wall 22' of the hole of the spool 22. Such knurl 21, adds to the eccentricity. The length of the shortest spool used on the spindle, should exceed the length of spindle member 15, and preferably shall be greater than the combined lengths of members 15 and 20. Also, the length of the screw 19, shall exceed the length of the nut member 20. The ends of the nut member may be rounded.

The size of the hole in the spools used on any particular spindle device, shall be such that the spool 22 can be easily but not loosely slipped on both spindle member 15 and nut member 20, with the nut member at least a bit spaced from the end of the spindle member.

Figure 3:
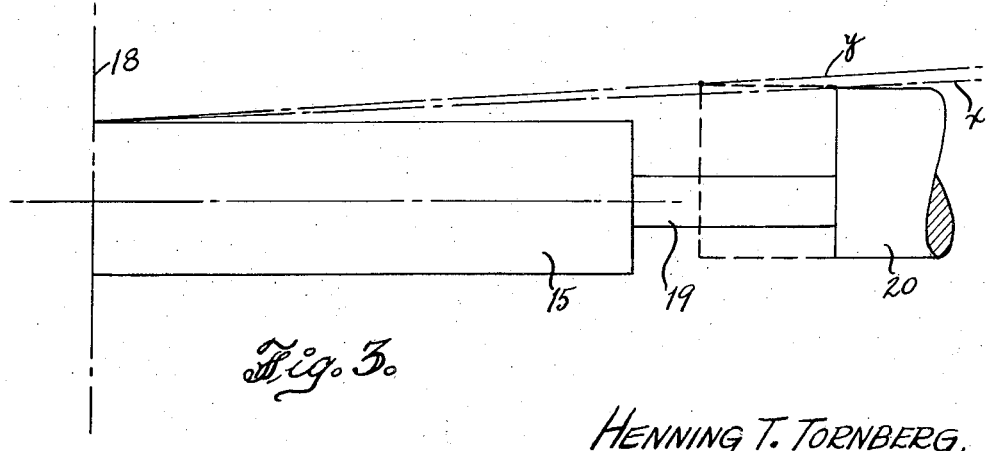
Fig. 3 is a diagrammatic representation for explaining the mode of operation of the spool lock.

In use, such condition, referring to Fig. 3, shows 22', the wall of the bore in the spool, to be represented by the line X. The spindle is held against rotation in any suitable manner as for instance holding on to knurled collar 18 by hand. Now the spool 22 is rotated axially, whereupon nut member 20 is caused to move along screw 19, in a direction towards collar 18, and the position of line X, is now at line Y. The spool is firmly gripped to spindle 15.

To release the spool, spindle 15 is held against rotation, and the spool turned in the opposite direction. This will cause the nut to move to its initial position, and the spool is unlocked and can be removed from off the spindle. The numeral 20' indicates the position of the nut member when the spool is gripped tightly. The knurling 21, aids the grip during locking movement and at locking position of the spool.

This invention is capable of numerous forms and various applications without departing from the essential features herein disclosed, as for instance in a display device, the spindle 15 may be stationary. It is therefore intended and desired that the embodiment herein be deemed illustrative and not restrictive and that the patent shall cover all patentable novelty herein set forth; reference being had to the following claim rather than to the specific description herein to indicate the scope of this invention.

I claim:

In a spindle to hold a tubular member thereon, a shank having a reduced exteriorly threaded portion and a nut eccentrically mounted on said threaded portion and in threaded engagement therewith, whereby when the nut is positioned at least a certain distance from the other portion of the shank, a tubular member of predetermined dimensions is receivable on the shank and nut and in frictional contact with the latter, and when the tubular member is so mounted, then upon some axial rotary movement of such tubular member in one direction with respect to the shank, the nut will be moved along said threaded portion towards the other portion of the shank and lock said member on the shank, and thereupon some axial rotary movement of such member in the opposite direction with respect to the shank, the nut will be moved away from such other portion of the shank and unlock said member from the shank whereby such member is freed for removal from off the shank and nut, in combination with a frame; said shank being axially rotatably mounted on said frame and extending therefrom with the threaded portion thereof furthest from the frame and means on the shank for manually holding same against axial rotary movement while the tubular member is on the shank.

HENNING T. TORNBERG.

REFERENCES CITED

The following references are of record in the file of this patent:

UNITED STATES PATENTS

| Number | Name | Date |
|---|---|---|
| 806,221 | Wardwell | Dec. 5, 1905 |
| 1,960,227 | Krissiep | May 22, 1934 |

FOREIGN PATENTS

| Number | Country | Date |
|---|---|---|
| 349,327 | Italy | June 11, 1937 |